United States Patent [19]

Schleeter et al.

[11] Patent Number: 4,969,272
[45] Date of Patent: Nov. 13, 1990

[54] DRIER/STRIPPER FOR CAR WASH

[76] Inventors: Robert H. Schleeter, 6358 Willow La., Minneapolis, Minn. 55430; Keith M. Schleeter, 2010 Freemont Ave. North, Minneapolis, Minn. 55411

[21] Appl. No.: 365,487

[22] Filed: Jun. 13, 1989

[51] Int. Cl.$^5$ ............................................. F26B 19/00
[52] U.S. Cl. .................................. 34/243 C; 15/312.2; 15/316.1
[58] Field of Search ............................. 34/243 C, 229; 15/316 R, 312 A, 312 R, 314, 315; 98/40.18, DIG. 7

[56] References Cited

U.S. PATENT DOCUMENTS

| | | |
|---|---|---|
| 2,440,157 | 4/1948 | Rousseau . |
| 2,448,834 | 6/1945 | Rousseau . |
| 2,949,678 | 8/1960 | Anderson . |
| 3,224,108 | 12/1965 | Flaming . |
| 3,263,341 | 8/1966 | Allen . |
| 3,442,027 | 5/1969 | Hurwitz . |
| 3,570,042 | 3/1971 | Solomon . |
| 3,600,224 | 8/1971 | Stilwell . |
| 3,780,448 | 12/1973 | Von Kulmer . |
| 3,877,107 | 4/1975 | Cirino . |
| 4,161,801 | 7/1979 | Day et al. . |
| 4,433,450 | 2/1984 | McElroy et al. ............... 15/312 X |

*Primary Examiner*—Albert J. Makay
*Assistant Examiner*—John Sollecito
*Attorney, Agent, or Firm*—Palmatier & Sjoquist

[57] ABSTRACT

A drier for a car wash comprising overhead air manifolds and fans, a multiplicity of depending sleeves or cloth ducts extending from the manifolds, the cloth ducts being of various lengths to respectively blow and strip water from the hood and roof of the automobile, the cloth ducts having restrictions in the air discharging end portions to accelerate the air to maintain the ducts in stationary condition and to maintain the ducts as stiff and rigid, there being side cloth air ducts also with tapered interior contours defining restrictions for accelerating the flow of air. The ducts also having oblong-shaped discharge openings at their end portions to shape the pattern of air flowing therefrom to spread the air across the relevant areas of the automobile body.

4 Claims, 3 Drawing Sheets

DRIER/STRIPPER FOR CAR WASH

This invention relates to a drier for a car wash.

BACKGROUND OF THE INVENTION

Car washing machines usually incorporate a drier which includes a blower and a nozzle arranged to direct air under pressure against the body of an automobile as the washing is finished so as to strip the water from the surface of the automobile body. In some instances, the owner and operator of a car wash will have someone available to wipe down the automobile body to finish the drying process, but in some self-serve operations, no wiping down is provided.

One extremely important factor to both the customers and to the operator of a car wash is to minimize any marking or damage to the surface of the automobile body, and the need to minimize such marking or damage has been emphasized recently because of the extremely high expense in repairing automobile body damage and the extreme cost of new autombiles. Such damage or markings may have to be repaired, at great expense, by the operator of the car wash.

In car washes as they were first created, driers usually used a rigid nozzle or a series of rigid nozzles, the location of which was controlled by rollers which actually engaged the surface of the automobile body and rolled along the body as the car moved through the drying station so that the nozzle would be positioned closely to the surface of the automobile body. One extreme disadvantage of this type of arrangement is the damage that would be caused occasionally by the rollers and the nozzle as the automobile progressed through the drying station.

Certain patents show such types of rigid nozzles and rollers which engage the automobile body, and they are identified as U.S. Pat. Nos. 2,440,157; 2,949,678; 3,224,108; 3,442,027; 3,570,042; 3,780,448 and 3,877,107. In some instances, rigid nozzles have actually engaged the surface of the automobile body, increasing the likelihood of causing markings and damage to the body, as in U.S. Pat. No. 3,263,341.

A drier using flexible sheet material in the form of thin plastic or plastic coated cloth is illustrated in U.S. Pat. No. 4,161,801 wherein flexible bags of generally rectangular cross section incorporate nozzle structures arranged to blow the air in a direction opposite to that in which the automobile is traveling through the car wash. The patent illustrates metal parts at the nozzle in order to maintain the nozzle shape. In one form of commercial device incorporating the type of rectangular bag disclosed in the patent, a rigid external plastic nozzle structure at the tip end of the bag regularly engages the automobile bodies being dried, increasing the likelihood of marking or damage to the body surface.

In another drier of U.S. Pat. No. 3,600,224, cloth tubes or sleeves extend from a manifold, and the sleeves whip around as the air is discharged from the open ended sleeves. Such whipping sleeves are particularly damaging to surfaces of automobile bodies and the small attachments such as antennas and mirrors.

Another form of drier is illustrated in U.S. Pat. No. 2,448,834 and utilizes tandemly arranged canvas ducts extending downwardly from an air manifold and each of the canvas ducts has a canvas crosshead which engages the body and rubs along the body as air is discharged through a laced slot. Metal grommets reinforce the holes for the lacing and will undoubtedly engage and rub along portions of the automobile body.

SUMMARY OF THE INVENTION

An object of the invention is a new and improved drier for a car wash wherein all portions of the drier which may touch or be close to the automobile body surface are formed of flexible cloth, herein defined, as to minimize the likelihood of causing any marking or damage to the body surface.

The drier has a multiplicity of drier sleeves or ducts in banks respectively extending downwardly toward the top of the auto body and extending toward the sides of the body. The ducts and their end portions are made of flexible cloth such as canvas. The end portions of ducts of various lengths respectively extend into close proximity with the hood and top of the body.

The cloth ducts in each bank are clustered together in side-by-side relation to each other. The end portions of the ducts have restrictions formed therein to change the air flow and to stiffen the cloth portions of the ducts. The air flow through the cloth end portion is also accelerated to forcibly impinge upon the water on the auto body and strip or blow the water away. The restriction also stabilizes the cloth end portion and prevents vibration and tranverse whipping about that may occur without the restriction.

The lengths of the cloth ducts may vary from one installation to another. In some instances a bank of cloth ducts may include certain shorter cloth duct end portions, and also certain longer cloth duct end portions. Alternately, a bank of cloth ducts may have the ducts of uniform length.

Such shorter cloth end portions extend into close proximity with the top of the body, and the other longer end portions extend further as to extend into close proximity with the hood of the body. The longer cloth end portions will bend and be kinked as they engage the windshield of the car traveling through the car wash. The kinking reduces air flow through the kinked duct, and may cause the end portion to only lightly engage and wipe the roof of the body. At the same time, a greater proportion of the air is discharged from the shorter ducts to increase the stripping effect over the roof of the body.

The owner of the car wash may determine the length of ducts that may be appropriate for the type of vehicles being washed. For instance, in some tunnel car washes where the vehicles are pulled through the car wash by a chain, it may be that all of the ducts might be of one uniform length, so that the cloth end portions do not ever touch any portion of the vehicles being washed. This arrangment might be particularly useful if the car wash specializes in servicing only passenger type automobiles.

In other situations the cloth end portions may be at a higher elevation if the car wash is to accommodate vans and pick-up trucks. On the other hand, ducts of various lengths may be used in car washes, such as a roll-over type car wash, where the driver remains in the vehicle and drives it into and through the wash station and then the drier station. In this arrangement, the longer ducts extend into close proximity to the hoods of the vehicles and then are engaged and bent by the windshields; and shorter cloth duct end portions extend into close proximity with the tops or roofs of the vehicle bodies. The driver may see forwardly beneath the end portions of the shorter cloth ducts and between adjacent longer cloth ducts.

DETAILED SPECIFICATION

Figure 1:
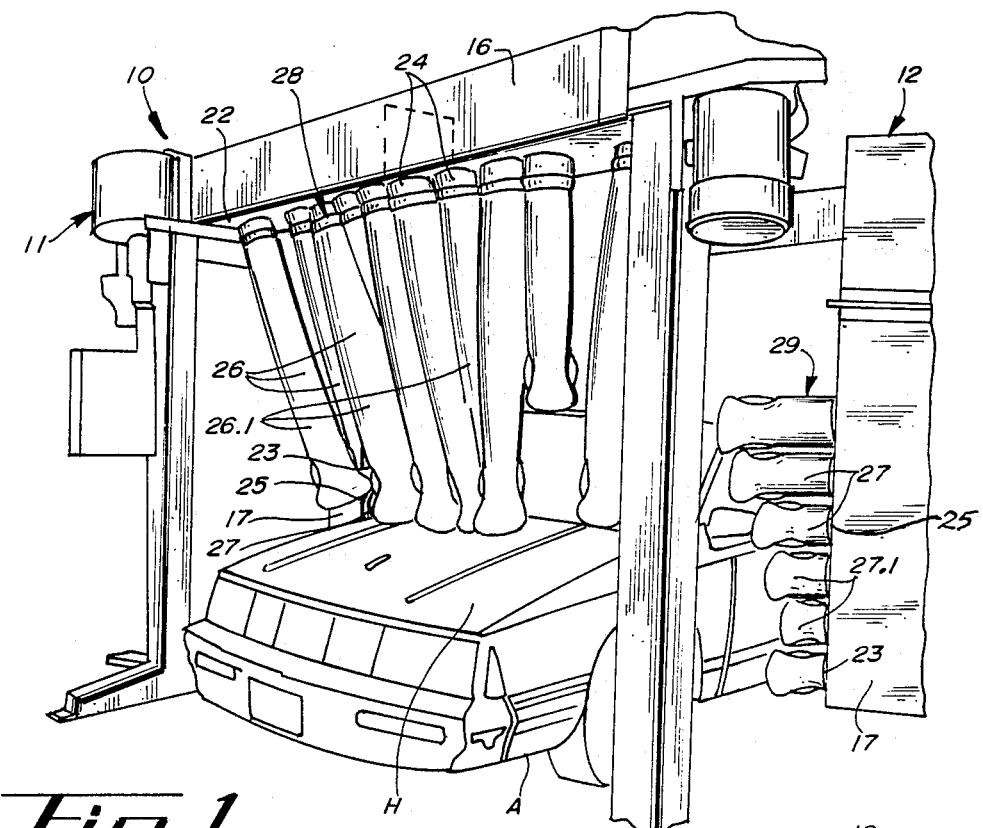
FIG. 1 is a perspective view generally illustrating the drier and showing an automobile emerging therethrough.

One form of the drier 10 is illustrated in the drawings and is described herein. The drier preferably has an overhead or top drier portion 11 and a pair of side drier portions 12, on opposite sides of the vehicle or automobile A. One or more of the drier portions 11, 12 may be repeated to obtain another stage of drying, and in FIGS. 2 and 3, a second stage of drying is obtained by the additional drier portion 11.1. Similarly, additional stages of drying at the side of the car or automobile A may be obtained by repeating the side drier portion along the path of the automobile moving through the car wash and drier system. It will be recognized that each of the drier portions, as illustrated, has its own support device or frame 13, 14 so that portions of the drier may be placed close together or may be spaced wider apart from each other, depending upon the preferences of the owner of the car wash and the space available.

Figure 3:
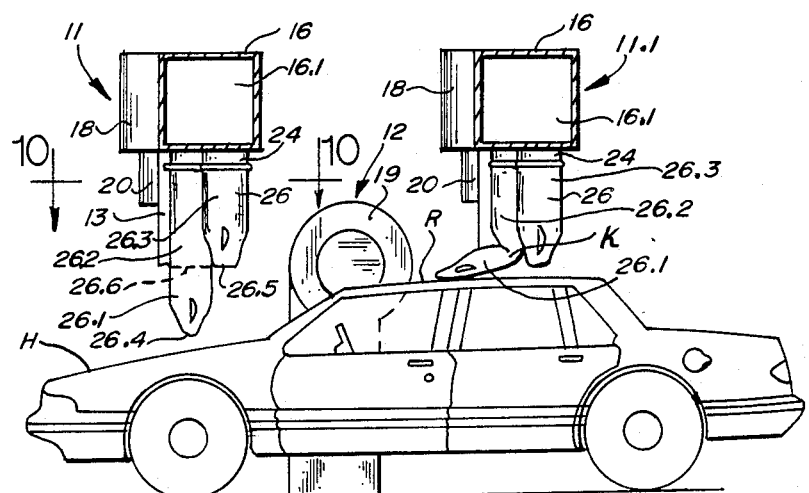
FIG. 3 is a section view through the drier and illustrating the functioning of the drier as an automobile passes therethrough.

In FIG. 3, the washing and rinsing portion of the car wash is illustrated in dotted lines and is indicated by the numeral 15. As is usual, the drier 10 is located downstream of the wash and rinse mechanism 15 in the washer as a whole.

As an alternate framing arrangement, the individual supports 13, 14 may be replaced by stationary arches or mounts of various sorts along the path of the automobile A traveling through the washer.

The two overhead drier portions 11, 11.1 are identical with each other, and an understanding of one will suffice for an understanding of both and similar reference numerals are used in these two portions. The drier portions 12 are repeated at opposite sides of the automobile as to provide drying for both sides of the vehicle.

Each of the drier portions 11, 12 have air manifolds 16, 17 and are provided with fan housings and fans 18, 19 and electric motors 20, 21 operating the fans to blow air into the manifolds and create air pressure therein.

Each of the manifolds 16 has a center divider panel 16.1 which separates the two ends of each of the manifolds 16 from each other; and accordingly, each of the fans 18 supplies air to half the interior chamber of the ducts 16.

The bottom sheet metal walls 22 of the overhead ducts 16, and the inner sidewalls 23 of the ducts 17 each has a plurality of openings formed therein and metal spouts or short ducts 24, 25 protruding therefrom. The spouts 25 in the side manifolds 17 protrude substantially horizontally from the side manifolds; and the spouts 24 protrude downwardly from the manifold 16, but it should be recognized that the spouts 24 are slightly inclined or tilted as to be oriented on an oblique angle and inwardly toward the center between the two fan housings 18 and downwardly.

The drier 10 includes a multiplicity of ducts or sleeves 26, 27 respectively mounted on and clamped to spouts 24, 25 on the overhead and side blower portions 11, 12, respectively. The ducts 26, 27 are in air communicating relation to the spouts 24, 25 for carrying the pressurized air from fans 18, 19.

The ducts 26, 27 are made of flexible cloth. For purposes of the present invention, cloth is intended to include a wide range of materials which will not damage a vehicle body surface if it touches the surface, and which will confine the flow of air. A preferred form of material in the duct end portions is canvas, such as 18 gauge canvas, but may also be formed of other types of woven, non-woven, knitted, drawn or extruded natural or synthetic fabric including but not limited to such materials as duck or of various other woven fabrics, or films of plastic such as polyethylene, Mylar, Teflon, or others, knitted or looped materials made of yarn or thread, or non-woven fibrous materials such as paper or felt of wool, cotton or other natural or synthetic fibers and other similar flexible sheet materials or combinations thereof, or such materials with coatings that may be found suitable. For purposes of this disclosure and the claims, all such materials and their equivalents are included within the designation of cloth. It is important that the cloth in the ducts 26, 27 be of such a nature as to prevent making marks or otherwise damaging the surface of the automobile A as they automobile moves through the drier. The cloth ducts may be removed from time to time and be washed or laundered.

It will be recognized that the spouts 24, 25 on the manifolds 16, 17 are arranged closely together in rows or clusters so that the cloth ducts 26, 27 are also clustered into banks 28, 29 of ducts directing air at the surface of the automobile body moving through the drier.

With particular reference to the bank 28 of ducts 26, it is to be particularly noted that all of the cloth ducts 26 hang from the spouts 24 and extend substantially directly downwardly, as viewed from the side in FIG. 3. As viewed from the end of the drier as illustrated in FIG. 1, the cloth ducts 26 are slightly inclined, due to the inclination of the spouts 24 so that the lower end portions 26.1 of the cloth ducts are even more tightly clustered than their upper ends; and further as seen in FIG. 1, the downwardly extending cloth ducts 26 have a downwardly convergent orientation or tilt relative to each other, tending to more nearly concentrate the air emitting from the ducts near the central portion of the vehicle body.

The cloth end portions 26.1, 27.1 of the cloth ducts 26, 27 are substantially identical to each other regardless of the lengths of the cloth ducts, so an understanding of the end portions 26.1 of the cloth ducts 26 as illustrated in FIGS. 4–9 will suffice for an understanding of the corresponding end portions 27.1 of the cloth ducts 27.

In the bank 28 of depending cloth ducts 26, certain ducts 26.2 are relatively long, and certain ducts 26.3 in the bank 28 are relatively short. The longer cloth ducts 26.2 have a length so that their terminal ends 26.4 extend into close proximity with the hood H of the automobile A; and the shorter ducts 26.3 have a length so that their terminal ends 26.5 extend into close proximity with the top or roof R of the automobile. Preferably, the terminal ends 26.4, 26.5 of the ducts will come within about two inches of the hood and roof surfaces H and R, respectively, as the automobile travels along through the drier. Of course the spacing will vary somewhat because automobile sizes are less than standard and in some instances the spacings will be three inches or more and in some instances the spacing will be less than one inch. Preferably, the terminal ends 26.4 and 26.5 of the cloth ducts will not engage the surfaces of the automobile body as drying occurs.

Alternately, all of the ducts 26 in bank 28 may be of uniform length so that none of the cloth duct end portions will ever touch any portion of the vehicle being washed and dried. As seen in FIG. 3, cloth ducts 26.2 may have a length extending downwardly only to dotted line 26.6, thereby making all of the cloth ducts 26 in the bank 28 of substantially uniform length.

The cloth end portion 26.1 of each of the cloth ducts 26 has a restriction 30 formed therein. All of the ducts 26 are essentially round in cross section throughout most of the length thereof, and the metal spouts 24, 25 which mount the ducts 26, 27 and connect the ducts to the manifolds are also circular in cross section. At the restriction 30 in the end portion 26.1, the restricted duct also has a substantially circular cross section, as seen in FIG. 9.

The particular form of restriction illustrated in the drawing and described herein is preferable over other forms of restriction, but other forms of restriction are possible. The restriction 30 provides a tapering toward smaller size at 30.1 which is convergent toward the end edge 26.4 of the duct and away from the manifold. The restriction 30 defines a shape which somewhwat simulates a venturi section 31, known to produce an accelerating of the air passing therethrough and a reduction in pressure as compared to the higher back pressure in the upper portions of the cloth duct as to maintain the duct fully distended with a generally circular cross section.

Figures 7, 9:
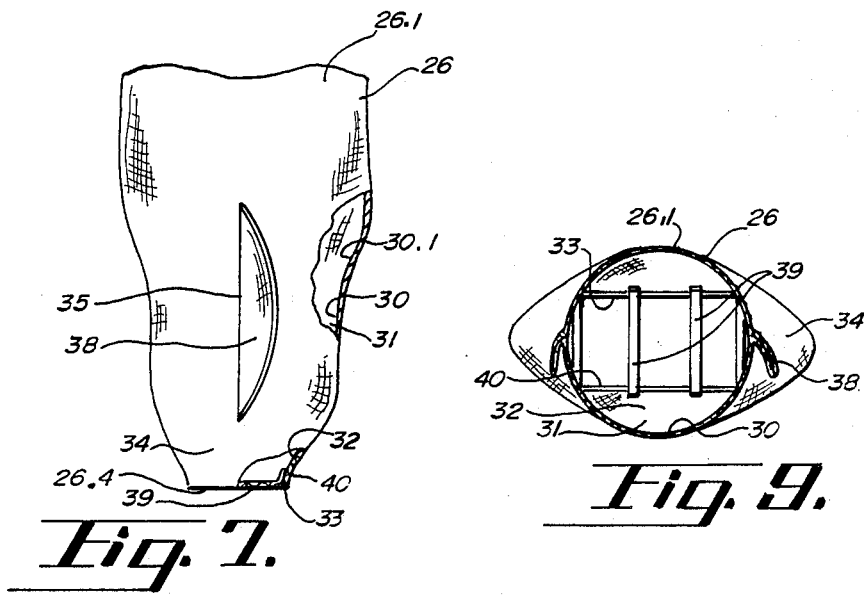
FIG. 7 is a detail side elevation view of an end portion of a cloth duct as illustrated in FIG. 6 and showing the duct distended with air moving through it.
FIG. 9 is a detail section view taken at 9—9 of FIG. 6.

The end portion 26.1 of the cloth duct 26 also has a tapered contour 32 immediately adjacent the end edge 26.4 and again tapers convergently toward the edge 26.4 as best seen in FIG. 7. The duct is provided with a generally flattened shape manifested in the oblong shape of the discharge opening 33 at the end edge 26.4. The oblong or flattened opening 33 causes portions 34 of the end portion of the duct to flare or taper outwardly immediately adjacent the end edge.

Figures 4, 6:
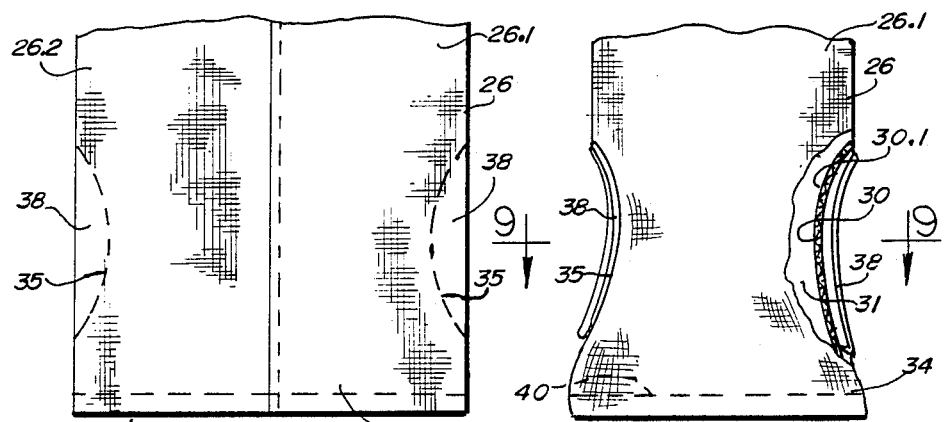
FIG. 4 is a detail elevation view of the end portion of a cloth duct utilized in the drier without air moving therethrough.
FIG. 6 is a detail front elevation view of the end portion of a cloth duct and showing the duct distended as air moves through it.
Figure 5:
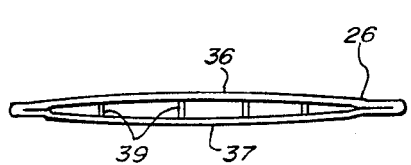
FIG. 5 is a detail bottom plan view of the end portion of the drier duct or sleeve illustrated in FIG. 4.
Figure 8:
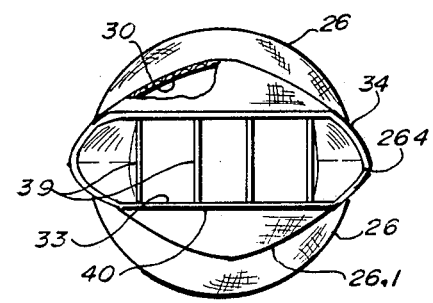
FIG. 8 is a detail bottom plan view of the end portion of the cloth duct illustrated in FIG. 6 and showing the open end in addition to the distended shape of the duct.

In the end portions 26.1 of the cloth ducts illustrated, the tapered contour 30.1 and the restriction 30 is obtained by stitching the fabric at 35 as illustrated in FIG. 4. When the duct 26 is not distended, and when the front and back panels 36, 37 of the canvas sleeve or duct lie against each other, the front and back panels are stitched together by the stitching 35, and adjacent each of the stitchings, a fabric ear 38 is defined. By reason of the stitchings 35, the canvas in the ears 38 continues to lie in two thicknesses, flat against each other, and when the cloth duct 26 is distended under influence of air pressure, the ears 38 continue to exist, but change their orientation, substantially as illustrated.

Although the restriction 30 in the end portion 26.1 of the duct is formed by the stitching 35, certainly the restriction may be formed in other ways, as by a drawstring around the periphery of the cloth end portion 26.1; or the restriction may be formed by a multiplicity of stitchings of small darts in the cloth fabric. Alternately, the restriction 30 might be formed by lacings or tape traversing the inside of the cloth end portion 26.1 wherever the restriction 30 is to be.

The cloth duct end portions 26.1 need not necessarily have substantially round shapes at restrictions 30, but the restrictions may be otherwise shaped. For instance, the cross sectional shapes of the duct end portions 26.1 may be oblong or elliptical at the restrictions 30.

In some instances where the air accelerating restrictions 30 are spaced well away from the end edges 26.4, the cloth end portions may be shaped by substantially rigid clamps or brackets at and defining the restrictions 30, but making sure that adequate lengths of cloth end portions remain to prevent such clamps or brackets from engaging or touching the body surace of the vehicle being dried.

It is to be noted that the restriction according to the present invention does have a generally smooth and circular inner periphery which contributes to the rather smooth flow of air through the restriction, but in other instances it may be desirable to produce a certain amount of turbulence in the flow of air and in the use of a drawstring around the periphery of the duct, the restriction may be combined with an undulation of the cloth fabric.

As illustrated, the shape of the cloth duct end portion 26.1 is changed adjacent the end edge 26.4. The duct end portion 26.1 is flattened to better shape the stream of air exiting the duct end portion. The flattening of the discharge opening 33 adjacent the end edge 26.4 is obtained by cloth fabric strips or tabs 39 with their ends fastened as by stitching to the hem 40 of the duct canvas, which hem forms a stiffening at the opening 33. Alternately, string or laces may be used to retain the end portion in flattened shape, in place of or supplemental to the fabric strips. The flattened portion of end portion 26.1 may be considered as a portion of restriction 30, or because of the change in shape, the flattened portion may be considered to be a restriction separate from restriction 30. In some instances, depending upon the shape of the air stream desired, the end portion 30.1 may not be flattened, as by eliminating the strips or tabs 39. Alternately, the entire air acceleration may be obtained by the illustrated flattening of the cloth end portion 26.1, to the exclusion of restriction 30.

Figure 10:
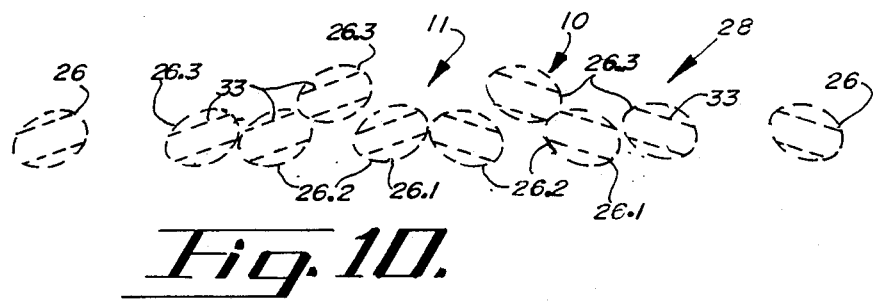
FIG. 10 is a diagrammatic illustration as viewed approximately at 10—10 of FIG. 3 and illustrating the orientation and the clustering of the cloth ducts in the overhead bank of drier ducts.

With particular reference to FIG. 10, the sketch illustrates the clustered end portions 26.1 of the top ducts hanging downwardly toward the automobile A. When the cloth ducts 26 are clamped onto the spouts 24, the cloth ducts are turned slightly so that the flattened oblong openings 33 are oriented obliquely of the rows in which the spouts 24 and ducts 26 lie. As best seen in FIG. 10, the flattened, oblong openings 33 are oriented to one orientation on one side of the row of ducts, and are oriented with an opposite oblique orientation at the other side.

It is important to recognize that air flow through ducts 26, 27 is essentially linear from spouts 24, 25 to the discharge ends at edges 26.4, 26.5, and without any requirement or need to turn to the side. Accordingly, the flowing air does not cause any tendency for moving the cloth ducts 26, 27 in any transverse direction. The air moves straight through and accelerates to strip the water from the vehicle body surfaces.

Figure 2:
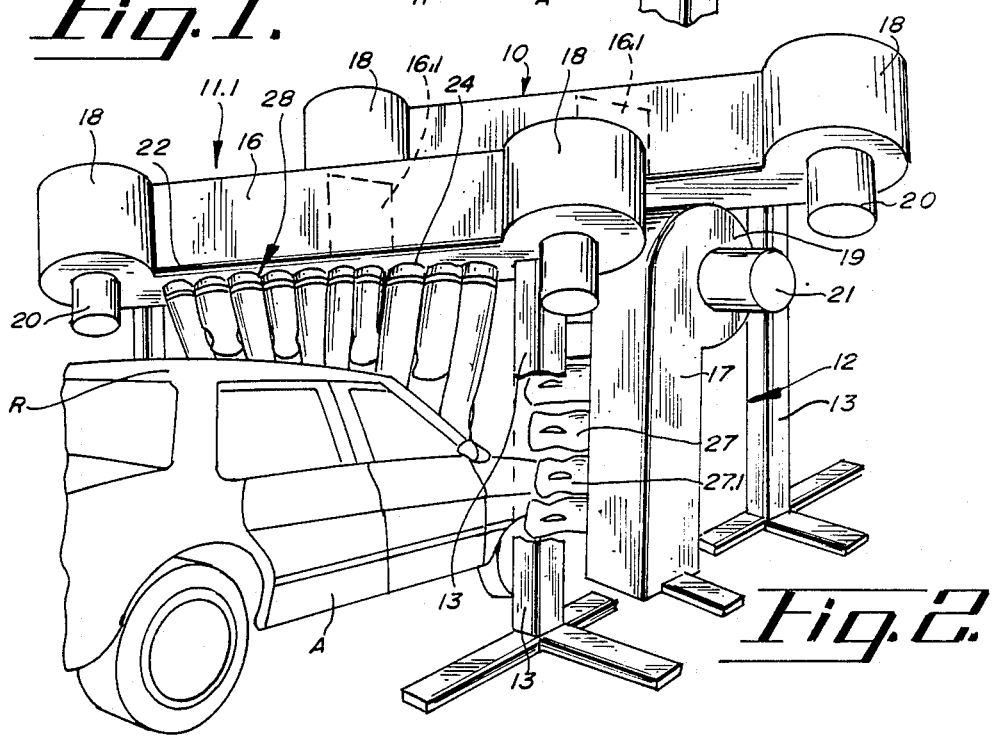
FIG. 2 is another perspective view of the drier showing an automobile moving into the drier.

With respect to the bank 29 of ducts 27 which extend inwardly toward the sides of the automobile, the end edges of those ducts will also be spaced slightly from the side surface of the automobile, but the entire ducts 27 are made of cloth, identically to the ducts 26. The ducts 27 are of such lengths that their end edges generally follow the shape of the contour of the automobile sidewall and the varying lengths are illustrated in FIG. 2. As pointed out previously, the ducts 27 also have constrictions as illustrated in FIGS. 6–9 and have tapered interior contours for purpose of stiffening the cloth ducts and accelerating the air moving therethrough.

When the automobile A moves through the drier, air will be blown from the ducts, first onto the hood H, whereupon the water will be stripped therefrom, and then the longer cloth ducts will engage the windshield of the automobile at their lower end portions 26.1 whereupon the longer ducts 26.2 will bend and form a kink as illustrated at the letter K in FIG. 3, whereupon air flow through the longer ducts is substantially terminated, or materially reduced. The shorter ducts 26.3 will extend into close proximity to the roof R of the automobile passing thereunder and air from the shorter ducts will blow and strip the water from the surface.

When the automobile has passed beneath the cloth air ducts 26 and passed by the side ducts 27, the surface of the automobile body will be essentially stripped of water and in many cases will not require any wiping down.

It will be seen that the invention has provided a drier with a multiplicity of cloth air ducts extending from a manifold, certain of the ducts being longer than others to blow against the hood and trunk areas of the automobile while the shorter ducts will blow and strip water from the roof of the automobile. Each of the cloth ducts has an end portion with a restriction to provide a tapered contour and to accelerate flow of air through the end portion of the duct and maintain the upper portion of the circular duct in distended condition. The lower end portion immediately adjacent the end edge is distended into a wide oblong shape so as to direct the air in a rather flat pattern and to allow the pattern of the air emitting from the duct to widen out in accordance with the shape of the duct as illustrated in FIG. 6.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. Air apparatus for stripping the water from the surface of the body of an automotive vehicle, comprising a source of air under pressure and including an air manifold having a plurality of air outlets, means supporting said manifold to accommodate relative movement between the vehicle and manifold adjacent to each other, a plurality of air ducts with air receiving ends connected to the air outlets and air discharging end portions extending endways away from the manifold and toward the body of the vehicle, said end portions being formed entirely of flexible cloth, and said cloth end portions having interior contours tapering convergently away from the manifold, and means pinching off peripheral portions in the cloth end portions of the ducts to produce the tapered contours.

2. Air apparatus for stripping the water from the surface of the body of an automotive vehicle, comprising a source of air under pressure and including an air manifold having a plurality of air outlets, means supporting said manifold to accommodate relative movement between the vehicle and manifold adjacent to each other, a plurality of air ducts with air receiving ends connected to the air outlets and air discharging end portions extending endways away from the manifold and toward the body of the vehicle, said end portions being formed entirely of flexible cloth, and said cloth end portions having interior contours tapering convergently away from the manifold and the cloth end portions tapering convergently to generally oblong openings through which the air flows, said cloth end portions including means spanning the interior of the cloth end portions and limiting distension thereof and producing the tapered contour, said means spanning the interiors of the end portions further comprising cloth ribbons.

3. Air apparatus for stripping the water from the surface of the body of an automotive vehicle, comprising a source of air under pressure and including an air manifold having a plurality of air outlets, means supporting said manifold to accommodate relative movement between the vehicle and manifold adjacent to each other, a plurality of air ducts with air receiving ends connected to the air outlets and air discharging end portions extending endways away from the manifold and toward the body of the vehicle, said end portions being formed entirely of flexible cloth, and said cloth end portions having interior contours tapering convergently away from the manifold, the cloth end portions having sewed-in portions defining said tapering contour, said sewed-in portions defining venturi-shaped interior contours which include said tapering contours.

4. Air apparatus for stripping the water from the surface of the body of an automotive vehicle, comprising a source of air under pressure and including an air manifold having a plurality of air outlets, means supporting said manifold to accommodate relative movement between the vehicle and manifold adjacent to each other, a plurality of air ducts with air receiving ends connected to the air outlets and air discharging end portions extending endways away from the manifold and toward the body of the vehicle, said end portions beformed entirely of flexible cloth, and said cloth end portions having interior contours tapering convergently away from the manifold, the cloth end portions having sewed-in portions defining said tapering contour, said sewed-in portions of the cloth end portions include cloth panels lying against each other and stitched together.

* * * * *